United States Patent
Hwang et al.

(10) Patent No.: US 7,521,151 B2
(45) Date of Patent: Apr. 21, 2009

(54) RECHARGEABLE LITHIUM BATTERY WITH SPECIFIC SURFACE ROUGHNESS OF POSITIVE ELECTRODE AND/OR NEGATIVE ELECTRODE

(75) Inventors: Duck-Chul Hwang, Suwon-si (KR); Seung-Sik Hwang, Seongnam-si (KR); Sang-Mock Lee, Suwon-si (KR); Chung-Kun Cho, Suwon-si (KR); Yun-Suk Choi, Cheonan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 765 days.

(21) Appl. No.: 10/933,384

(22) Filed: Sep. 3, 2004

(65) Prior Publication Data

US 2005/0069775 A1 Mar. 31, 2005

(30) Foreign Application Priority Data

Sep. 26, 2003 (KR) .................. 10-2003-0066900

(51) Int. Cl.
*H01M 4/02* (2006.01)
*H01M 4/00* (2006.01)
*H01M 4/60* (2006.01)
*H01M 4/58* (2006.01)
*H01M 6/00* (2006.01)

(52) U.S. Cl. ................. 429/209; 429/223; 429/213; 429/231.95; 429/122

(58) Field of Classification Search ............ 429/209, 429/223, 122
See application file for complete search history.

(56) References Cited

U.S. PATENT DOCUMENTS

| | | | |
|---|---|---|---|
| 5,556,723 A * | 9/1996 | Ohsaki et al. ........... | 429/231.8 |
| 5,631,100 A | 5/1997 | Yoshino et al. | |
| 6,051,340 A | 4/2000 | Kawakami et al. | |
| 6,365,300 B1 | 4/2002 | Ota et al. | |
| 6,432,585 B1 * | 8/2002 | Kawakami et al. ........ | 429/233 |
| 6,818,351 B2 * | 11/2004 | Sunagawa et al. ........ | 429/231.3 |
| 2003/0118913 A1 * | 6/2003 | Takami et al. ............ | 429/337 |
| 2003/0215710 A1 * | 11/2003 | Lavoie et al. ............ | 429/212 |

FOREIGN PATENT DOCUMENTS

| | | |
|---|---|---|
| EP | 1231653 | 8/2002 |
| EP | 1335438 | 8/2003 |
| EP | 1339116 A2 | 8/2003 |

(Continued)

OTHER PUBLICATIONS

European Search Report issued in corresponding European Patent Application No. 04090353.6 dated Feb. 14, 2008.

*Primary Examiner*—Dah-Wei D Yuan
*Assistant Examiner*—Zachary Best
(74) *Attorney, Agent, or Firm*—Stein, McEwen & Bui, LLP

(57) ABSTRACT

A rechargeable lithium battery includes a positive electrode having a positive active material to reversibly intercalate and deintercalate lithium ions, a negative electrode having a negative active material, and an electrolyte, wherein an arithmetic mean Ra of a surface roughness of the positive electrode is 155 to 419 nm, and an arithmetic mean Ra of a surface roughness of the negative electrode is 183 to 1159 nm after the rechargeable lithium battery is charged and discharged.

88 Claims, 2 Drawing Sheets

FOREIGN PATENT DOCUMENTS

| | | |
|---|---|---|
| EP | 1339116 A3 | 3/2005 |
| JP | 08-064201 | 3/1996 |
| JP | 10255773 A * | 9/1998 |
| JP | 2002-279972 | 9/2002 |
| JP | 2002279972 A * | 9/2002 |
| JP | 2004-6164 | 1/2004 |
| JP | 2004-247249 | 9/2004 |
| KR | 2004-46139 | 6/2004 |
| KR | 2004-67030 | 7/2004 |
| WO | WO 99/31744 | 6/1999 |

* cited by examiner

RECHARGEABLE LITHIUM BATTERY WITH SPECIFIC SURFACE ROUGHNESS OF POSITIVE ELECTRODE AND/OR NEGATIVE ELECTRODE

CROSS-REFERENCE TO RELATED APPLICATIONS

This application is based on application No. 2003-66900 filed in the Korean Intellectual Property Office on Sep. 26, 2003, the disclosure of which is incorporated hereinto by reference.

BACKGROUND OF THE INVENTION

1. Field of the Invention

The present invention relates to a rechargeable lithium battery, and more particularly, to a rechargeable lithium battery exhibiting effective cycle life characteristics.

2. Description of the Related Art

Current commercially available rechargeable lithium batteries exhibit higher power and energy density than the conventional nickel-cadmium battery or nickel hydrogen battery, and substantially generate 4 V, i.e., they have an average discharge potential of 3.7 V. Such a battery is considered an essential element in the digital generation since it is an indispensable energy source for portable digital devices such as a mobile telephone, a notebook computer, a camcorder and the like, which are abbreviated as 3C devices.

Positive electrodes use oxides which are capable of intercalating and deintercalating lithium ions, and negative electrodes use carbonaceous materials which are capable of intercalating and deintercalating lithium ions.

Even though rechargeable lithium batteries exhibit effective battery performance such as high power and energy density, the development of the industry requires more improved cycle life characteristics, and various studies have been undertaken thereon.

SUMMARY OF THE INVENTION

It is an aspect of the present invention to provide a rechargeable lithium battery exhibiting effective cycle life characteristics.

This and/or other aspects may be achieved by a rechargeable lithium battery including a positive electrode that has a positive active material which is capable of reversibly intercalating and deintercalating lithium ions; a negative electrode that has a negative active material; and an electrolyte. After the rechargeable lithium battery is charged and discharged, the positive electrode has an arithmetic average surface roughness Ra of 155 to 419 nm, or the negative electrode has an arithmetic average surface roughness Ra of 183 to 1159 nm. Alternatively, the positive electrode and the negative electrode simultaneously have the respective ranged values of the arithmetic average surface roughness.

The positive active material is generally a nickel-based active material or a mixture of the nickel-based active material and other active materials such as a cobalt- or manganese-based active material.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
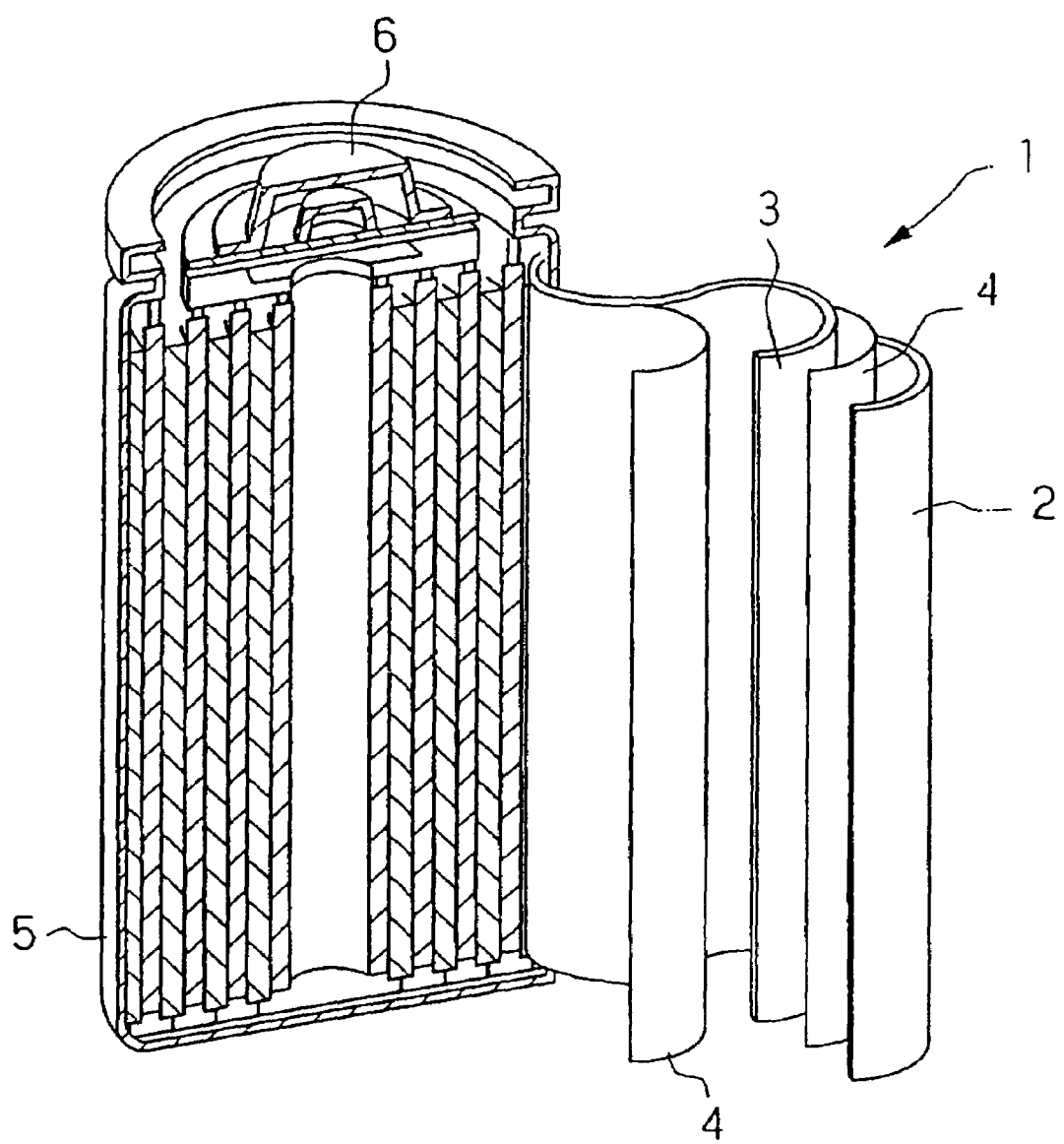
FIG. 1 is a representation of a rechargeable lithium battery in accordance with an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention relates to a rechargeable lithium battery exhibiting improved cycle life characteristics by controlling surface roughness of a positive electrode or a negative electrode, or of both electrodes. The present invention improves battery performance by controlling electrode surface roughness, but previous studies on the specific effect of surface roughness on battery performance have hitherto not been undertaken. For example, U.S. Pat. No. 6,365,300 discloses that a surface roughness of a negative electrode is one factor for activating formation of an inorganic electrolytic layer which prevents the formation of the dendrites of lithium metal on a lithium metal active material, but the patent is silent on the effect of the surface roughness on the cycle life characteristics. Surface roughness values of a current collector disclosed in U.S. Pat. No. 6,051,340 are merely data regarding physical properties of negative electrodes of metal that is capable of alloying with lithium. However, U.S. Pat. No. 6,051,340 is silent on the effect of the surface roughness on the battery performance. In addition, U.S. Pat. No. 5,631,100 discloses a surface roughness of a current collector, but the surface roughness has no effect on the capacity retention because the reduced surface roughness does not improve the capacity retention. Thus, it is well understood to one skilled in the related art that the cycle life characteristics improvement effect of the present invention by controlling surface roughness cannot be obtained from these cited references.

The surface roughness is defined as an arithmetic mean Ra and root mean square Rq. The arithmetic mean Ra indicates an arithmetic mean of each peak (according to highest and lowest parts of the surface of the electrode), and the root mean square Rq indicates rms (root mean square). The lower Ra and Rq indicate a more uniform surface.

A rechargeable lithium battery of the present invention includes a positive electrode, a negative electrode, and an electrolyte. The positive electrode and the negative electrode respectively include active materials which are capable of intercalating and deintercalating lithium ions.

After the assembly of the battery and before the charge and the discharge, the positive electrode preferably has an arithmetic mean Ra of surface roughness (hereinafter referred to as "Ra") of 141 to 359 nm, and more preferably 150 to 300 nm. The positive electrode preferably has a root mean square Rq (hereinafter referred to as "Rq") of 196 to 500 nm, and more preferably 215 to 450 nm.

Alternatively, even if the surface roughness of the positive electrode is outside these ranges, a surface roughness Ra of the negative electrode of 165 to 965 nm may achieve the effect of the present invention. The effective negative electrode generally has an Rq of 211 to 1250 nm, and more specifically 240 to 700 nm.

The effect of the present invention may also be achieved if the surface roughness of both the positive electrode and the negative electrode is in these ranges, as is well understood to one skilled in the related art.

During charging and discharging, the surface roughness increases in the rechargeable lithium battery having the surface roughness, reaching an Ra of 155 to 419 nm for the positive electrode, and more specifically 155 to 385 nm, and reaching an Rq of 219 to 591 nm, and more specifically 219 to 535 nm. Furthermore, the surface roughness of the negative electrode increases to an Ra of 183 to 1159 nm, more specifically 183 to 1141 nm, and most specifically 183 to 450 nm, and an Rq of 238 to 1518 nm, more specifically 255 to 1487 nm, and most specifically 255 to 1000 nm.

Figure 2:
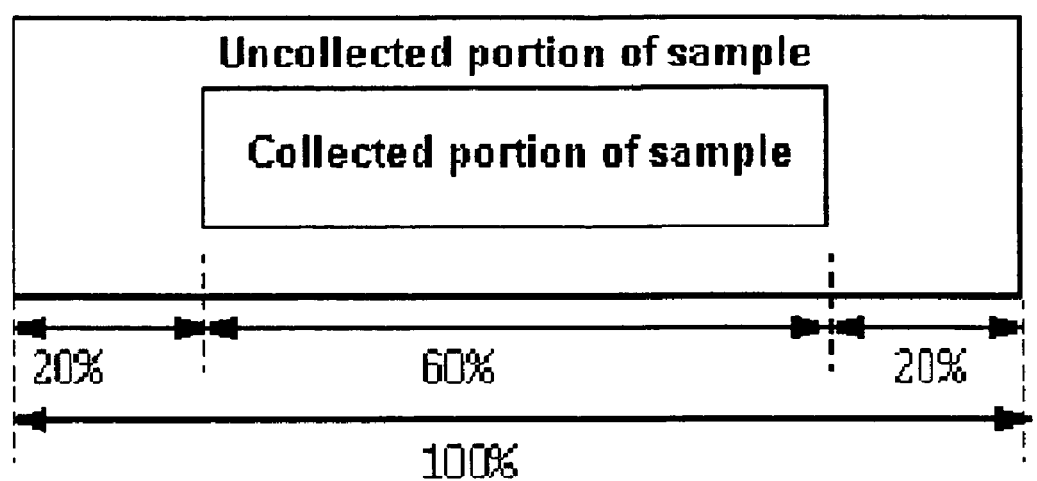
FIG. 2 is a representation of an embodiment of a collected portion of a sample of the electrode used for measuring the surface roughness of the electrode according to the present invention.

The surface roughness values after the charging and the discharging are obtained from measuring a sample collected from a central portion, as shown in FIG. 2, after the charged and the discharged battery is disassembled and is pre-treated. The central portion is a portion corresponding to 60% thereof, with the exception of right and left 20% portions, when the total longitudinal direction length and width of the electrode is 100%, as shown in FIG. 2. In addition, the central portion does not include the folded portion where the electrode is wound. The pre-treatment is performed by immersing the collected sample in an organic solvent such as dimethyl carbonate for 1 to 3 minutes, and then drying it at a temperature of approximately 40° C. under a vacuum of 10.0 torr to 1×10-8 torr for 30 minutes to 1 hour.

The charge and the discharge are performed at a charging rate between 0.1 and 2.0 C and generally between 0.2 and 1.5 C, and a discharging rate between 0.1 and 2.0 C, and generally 0.2 and 1.5 C. The charging current density is 0.1 to 5.0 mA/cm² based on area, and generally 0.2 to 4.0 mA/cm², and the discharge current density is 0.1 to 5.0 mA/cm² based on area, and generally 0.2 to 4.0 mA/cm². The charging and the discharging operations are performed under the above conditions. The repeating times of the charging and the discharging are not limited, but the charging and the discharging operations are generally performed several times, which are a formation operation and are a standard operation in the related art.

After the charging and the discharging, the battery is presented in the condition of a charged or discharged state, or in a state of being charged or being discharged. Furthermore, the battery has an Open Circuit Voltage (OCV) of 1.0 to 5.5 V, and preferably 1.5 to 4.5 V, after the charging and the discharging.

The negative active material is a carbonaceous material which is capable of reversibly intercalating or deintercalating lithium ions. The carbonaceous material may be a crystalline or amorphous carbonaceous material, and is generally a crystalline carbonaceous material having an Lc (crystallite size) of at least 20 nm in X-ray diffraction, and exhibiting an exothermic peak at 700° C. or more. The crystalline carbonaceous material is generally carbonaceous material prepared by carbonizing mesophase spherical particles and a graphi-tizing operation on the carbonized material, or graphite fiber prepared by carbonizing and graphitizing.

The positive active material may be any compound which is generally used as a positive active material in rechargeable lithium batteries. An example thereof is one selected from the group consisting of compounds represented by formulas 1 to 18.

$$LiNiO_2 \tag{1}$$

$$LiCoO_2 \tag{2}$$

$$LiMnO_2 \tag{3}$$

$$LiMn_2O_4 \tag{4}$$

$$Li_aNi_bB_cM_dO_2 \tag{5}$$

(wherein $0.90 \leq a \leq 1.1$, $0 \leq b \leq 0.9$, $0 \leq c \leq 0.5$, $0.001 \leq d \leq 0.1$)

$$Li_aNi_bCo_cMn_dM_eO_2 \tag{6}$$

(wherein $0.90 \leq a \leq 1.1$, $0 \leq b \leq 0.9$, $0 \leq c \leq 0.5$, $0 \leq d \leq 0.5$, $0.001 \leq e \leq 0.1$)

$$Li_aNiM_bO_2 \tag{7}$$

$(0.90 \leq a \leq 1.1, 0.001 \leq b \leq 0.1)$ $$Li_aCoM_bO_2 \tag{8}$$

$(0.90 \leq a \leq 1.1, 0.001 \leq b \leq 0.1)$ $$Li_aMnM_bO_2 \tag{9}$$

$(0.90 \leq a \leq 1.1, 0.001 \leq b \leq 0.1)$ $$Li_aMn_2M_bO_4 \tag{10}$$

$(0.90 \leq a \leq 1.1, 0.001 \leq b \leq 0.1)$ $$DS_2 \tag{11}$$

$$LiDS_2 \tag{12}$$

$$V_2O_5 \tag{13}$$

$$LiV_2O_5 \tag{14}$$

$$LiEO_2 \tag{15}$$

$$LiNiVO_4 \tag{16}$$

$$Li_{(3-x)}F_2(PO_4)_3 (0 \leq x \leq 3) \tag{17}$$

$$Li_{(3-x)}Fe_2(PO_4)_3 (0 \leq x \leq 2) \tag{18}$$

(wherein B is Co or Mn;
D is Ti or Mo;
E is selected from the group consisting of Cr, V, Fe, Sc, and Y;
F is selected from the group consisting of V, Cr, Mn, Co, Ni, and Cu; and
M is at least one transition metal or lanthanide selected from the group consisting of Al, Cr, Mn, Fe, Mg, La, Ce, Sr, and V).

The positive active material may include a coating layer on a surface of the bare compound, or a mixture of the compound and the coating compound. The coating layer may include at least one coating element-included compound selected from the group consisting of hydroxides of a coating element, oxyhydroxides thereof, oxycarbonates thereof, and hydroxy-carbonates thereof. The coating element-included compound may be amorphous or crystalline. The coating element may be Mg, Al, Co, K, Na, Ca, Si, Ti, V, Sn, Ge, Ga, B, As, Zr, or a mixture thereof. The coating process may be performed by any technique which does not adversely affect the physical properties of the positive active material (for example spray coating, immersion, and the like), and it is not described in detail since it is well understood to one skilled in the related art.

The improvement of the cycle life characteristics is more effectively shown in nickel-based compounds of the compounds represented by formulas 1 to 18 by controlling the surface roughness of the electrode. Examples of the nickel-based compounds are compounds represented by formulas 1, 5-7, and 16. That is, the preferred positive active material is one or at least two nickel-based compounds represented by formulas 1, 5-7, or 16, or a mixture of the nickel-based compound and another compound represented by formulas 2-4, 8-15, and 17-18.

The lower strength of the nickel-based compound renders formation of electrodes with lower surface roughness during the pressurizing operation. Such a lower surface roughness effectively improves the cycle life characteristics. The reduced surface roughness is related to the positive electrode, but is not related to the negative electrode when the nickel-based compound is used as the positive active material.

The battery with the nickel-based compound generally has a positive electrode surface roughness Ra of 150 to 312 nm, and more specifically 150 to 225 nm, and an Rq of 196 to 440 nm, and more specifically 196 to 330 nm, before the charging and the discharging. After the charging and the discharging, the Ra is preferably 155 to 356 nm, and more specifically 155 to 280 nm, and the Rq is 219 to 498 nm, and more specifically 219 to 350 nm.

Furthermore, a density of an active mass of the electrode, which is obtained by dividing the weight of the active mass (including an active material, a conductive agent, and a binder, and excluding the current collector) by its volume and has a unit of g/cc, is an important factor for realizing the effect of the present invention. That is, as the density of the active mass of the electrode increases, the surface roughness decreases, thus improving the cycle life characteristics. However, a density that is too high causes an excessive decrease in the low surface roughness, so that the cycle life characteristic is reduced. Thus, the density of the active mass should be suitably controlled. The density of the positive electrode is generally 3.0 to 3.9 g/cc, and that of the negative electrode is generally 1.1 to 2.0 g/cc.

The surface roughness may be controlled by any generally known technique, and generally by controlling the surface roughness of the pressurizer during the pressurizing operation because it is simple and economical without modification of the total electrode procedures. In addition, the surface roughness of the present invention may be obtained by controlling the pressurizing conditions such as pressure and time.

The surface roughness of the pressurizer may be controlled by any generally known technique as long as the obtained surface roughness is in the Ra range of between 10 and 30 nm, with an Rq of between 12 and 39 nm. An example thereof is a super-finishing procedure in which a grindstone with microparticles is in contact with a cylindrical, a flat, or a spherical surface, thus providing vibration thereto.

A non-aqueous electrolyte of the present invention may include a non-aqueous organic solvent and a lithium salt.

The lithium salt is dissolved in an organic solvent to act as a lithium-ion supporting source, which helps to allow the operation of the battery and facilitate the transfer of lithium ions. The lithium salt may be one or at least two selected from $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)(C_xF_{2y+1}SO_2)$ (where x and y are natural numbers), LiCl, and LiI, as supporting salts. The concentration of the lithium salt is suitably 0.1 to 2.0 M in the electrolyte.

The non-aqueous organic solvent acts as a medium which can transport ions that participate in the electrochemical reactions. The non-aqueous organic solvent includes one or at least two selected from benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotolune, 1,2,4-triiodotoluene, R—CN (where R is a $C_2$-$C_{50}$ linear, branched, or cyclic hydrocarbon, and may include double bonds, aromatic cycling, or ether bonds), dimethylformamide, dimethylacetate, xylene, cyclohexane, tetrahydrofurane, 2-methyltetrahydrofurane, cyclohexanone, ethanol, isopropyl alcohol, dimethyl carbonate, ethylmethyl carbonate, diethyl carbonate, methylpropyl carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, γ-butyrolactone, sulfolane, valerolactone, decanolide, or mevalolactone.

If a mixed solvent is used, the mixing ratio may be suitably controlled according to a desired battery performance, as may be understood by one skilled in the related art.

An embodiment of the rechargeable lithium battery 1 of the present invention is illustrated in FIG. 1. The rechargeable lithium battery includes a positive electrode 3; a negative electrode 2; a separator 4 interposed between the positive electrode 3 and the negative electrode 2; an electrolyte in which the positive electrode 2, the negative electrode 3, and the separator 4 are immersed; a cylindrical battery case 5; and a sealing portion 6. The configuration of the rechargeable lithium battery is not limited to the structure shown in FIG. 1, as it can be readily modified into a prismatic or pouch type battery as is well understood in the related art.

The following examples illustrate the present invention in further detail, but it is understood that the present invention is not limited by these examples.

I. Production of Electrodes

* Using a $LiCoO_2$ Positive Active Material

EXAMPLE 1

A $LiCoO_2$ positive active material, a polyvinylidene fluoride binder and a Super-P conductive agent at a 94:3:3 weight ratio were dissolved in an N-methyl pyrrolidone solvent to prepare a positive active material slurry. The positive active material slurry was coated on an aluminum current collector and dried. The resulting electrode was referred to as a positive electrode precursor.

The positive electrode precursor was pressurized with a pressurizer. The pressurizer was produced by smoothing a surface of a commercial pressurizer with an initial surface roughness Ra of 55 nm and Rq of 67 nm to the final surface roughness Ra of 30 nm and Rq of 39 nm. After pressurizing, the resulting positive electrode had a density of an active mass of 3.60 g/cc.

EXAMPLE 2

A positive electrode was produced by the same procedure as in Example 1, except that a surface roughness of the pressurizer with an Ra of 10 nm and Rq of 12 nm was used. After pressurizing, the resulting positive electrode had a density of an active mass of 3.60 g/cc.

COMPARATIVE EXAMPLE 1

A positive electrode was produced by the same procedure as in Example 1, except that a commercial pressurizer with an Ra of 55 nm and an Rq of 67 nm was used. After pressurizing, the resulting positive electrode had a density of an active mass of 3.60 g/cc.

The surface roughness Ra and Rq of the positive electrodes according to Examples 1 and 2 and Comparative Example 1 were measured, and the results are shown in Table. 1. For reference, the surface roughness Ra and Rq of the positive electrode precursor was also measured, and the results are presented in Table 1.

TABLE 1

| Positive electrode precursor | | Comparative Example 1 | | Example 1 | | Example 2 | |
|---|---|---|---|---|---|---|---|
| Ra(nm) | Rq(nm) | Ra(nm) | Rq(nm) | Ra(nm) | Rq(nm) | Ra(nm) | Rq(nm) |
| 2190 | 3066 | 553 | 780 | 359 | 499 | 181 | 250 |

As shown in Table 1, the surface roughness Ra and Rq of the positive electrodes according to Examples 1 and 2 are substantially lower than the surface roughness of Comparative Example 1.

EXAMPLE 3

A carbon negative active material and a polyvinylidene fluoride binder were dissolved in an N-methyl pyrrolidone solvent to prepare a negative active material slurry. The negative active material slurry was coated on a Cu current collector and dried. The dried electrode was referred to as a negative electrode precursor. The negative electrode precursor was pressurized using the pressurizer used in Example 1. After pressurizing, the negative electrode had a density of the active mass of 1.60 g/cc.

EXAMPLE 4

A negative electrode was produced by the same procedure as in Example 3, except that the pressurizer used in Example 2 was used.

COMPARATIVE EXAMPLE 2

A negative electrode was produced by the same procedure as in Example 3, except that the pressurizer used in Comparative Example 1 was used.

The surface roughness Ra and Rq of the negative electrodes according to Examples 3 to 4 and Comparative Example 2 were measured, and the results are presented in Table 2. For reference, the surface roughness Ra and Rq of the negative electrode prior to the pressurizing was measured, and the result is shown in Table 2.

TABLE 2

| Negative electrode precursor | | Comparative Example 2 | | Example 3 | | Example 4 | |
|---|---|---|---|---|---|---|---|
| Ra(nm) | Rq(nm) | Ra(nm) | Rq(nm) | Ra(nm) | Rq(nm) | Ra(nm) | Rq(nm) |
| 5300 | 6890 | 1524 | 1996 | 965 | 1245 | 179 | 234 |

As shown in Table 2, the surface roughness Ra and Rq of the negative electrodes according to Examples 3 to 4 are substantially lower than the surface roughness of Comparative Example 2.

EXAMPLE 5

A positive electrode was produced by the same procedure as in Example 1, except that the positive electrode precursor prepared by Example 1 was pressurized using a pressurizer with a surface roughness Ra of 10 nm and Rq of 12 nm, to obtain a density of the active mass of 3.0 g/cc.

EXAMPLE 6

A positive electrode was produced by the same procedure as in Example 5, except that the pressurizing operation was performed until a density of the active mass reached 3.3 g/cc.

EXAMPLE 7

A positive electrode was produced by the same procedure as in Example 5, except that the pressurizing operation was performed until a density of the active mass reached 3.9 g/cc.

COMPARATIVE EXAMPLE 3

A positive electrode was produced by the same procedure as in Example 5, except that the pressurizing operation was performed until a density of the active mass reached 4.2 g/cc.

The surface roughness of the positive electrodes according to Examples 5 to 7 and Comparative Example 3 were measured, and the results are presented in Table 3. Furthermore, in order to identify the effect of the density of the active mass on the surface roughness Ra and Rq, the surface roughness Ra and Rq of Example 2 are also shown in Table 3. For reference, the surface roughness Ra and Rq of the positive electrode precursor are presented in Table 3. In Table 3, the units of the Ra and Rq are nm.

TABLE 3

| | Ra | Rq | Density of the active mass (g/cc) |
|---|---|---|---|
| Positive electrode precursor | 2090 | 3066 | — |
| Example 5 | 265 | 376 | 3.0 |
| Example 6 | 214 | 297 | 3.3 |
| Example 2 | 181 | 250 | 3.6 |
| Example 7 | 167 | 229 | 3.9 |
| Comparative Example 3 | 151 | 216 | 4.2 |

As shown in Table 3, as the density of the active mass increases, the surface roughness Ra and Rq decrease even though the same pressurizer was used.

EXAMPLE 8

A negative electrode was produced by the same procedure as in Example 3, except that the negative electrode precursor prepared by Example 3 was pressurized using a pressurizer with a surface roughness of Ra of 10 nm and Rq of 12 nm until a density of the active mass reached 1.1 g/cc.

EXAMPLE 9

A negative electrode was produced by the same procedure as in Example 8, except that the pressurizing operation was performed until a density of the active mass reached to 1.4 g/cc.

EXAMPLE 10

A negative electrode was produced by the same procedure as in Example 8, except that the pressurizing operation was performed until a density of the active mass reached 2.0 g/cc.

COMPARATIVE EXAMPLE 4

A negative electrode was produced by the same procedure as in Example 8, except that the pressurizing operation was performed until a density of the active mass reached 2.3 g/cc.

The surface toughness Ra and Rq of the negative electrodes according to Examples 8 to 10 and Comparative Example 4 were measured, and the results are presented in Table 4. Furthermore, in order to identify the effect of the density of the active mass on the surface roughness Ra and Rq, the surface roughness Ra and Rq of Example 3 are also shown in Table 4. For reference, the surface roughness Ra and Rq of the negative electrode precursor are presented in Table 4. In Table 4, the units of the Ra and Rq are nm.

TABLE 4

| | Ra | Rq | Density of active mass (g/cc) |
|---|---|---|---|
| Negative electrode precursor | 5300 | 6890 | — |
| Example 8 | 256 | 335 | 1.1 |
| Example 9 | 210 | 277 | 1.4 |
| Example 3 | 179 | 234 | 1.6 |
| Example 10 | 165 | 211 | 2.0 |
| Comparative Example 4 | 149 | 188 | 2.3 |

It is shown from Table 4 that, as the density of the active mass decreases, the surface roughness Ra and Rq decrease.

* The use of $LiNi_{0.8}Co_{0.1}Mn_{0.1}O_2$ Positive Active Material

EXAMPLE 11

$LiNi_{0.8}Co_{0.1}Mn_{0.1}O_2$ obtained from the co-precipitation as a positive active material, polyvinylidene fluoride as a binder, and Super-P as a conductive agent, combined in a 94:3:3 weight ratio, were dissolved in N-methyl pyrrolidone as a solvent to prepare a positive active material slurry. The positive active material slurry was coated on an aluminum current collector and dried. The dried product was referred to as a positive electrode precursor.

The positive electrode precursor was pressurized with a pressurizer. The pressurizer was produced by smoothing a surface of a commercial pressurizer with an initial surface roughness of Ra of 55 nm and Rq of 67 nm to the final surface roughness Ra of 30 nm and Rq of 39 nm. After pressurizing, the resulting positive electrode had a density of an active mass of 3.60 g/cc.

EXAMPLE 12

A positive electrode was produced by the same procedure as in Example 11, except that a surface roughness of the pressurizer with an Ra of 10 nm and an Rq of 12 nm was used. After pressurizing, the resulting positive electrode had a density of an active mass of 3.60 g/cc.

COMPARATIVE EXAMPLE 5

A positive electrode was produced by the same procedure as in Example 11, except that the commercial pressurizer with an Ra of 55 nm and an Rq of 67 nm was used. After pressurizing, the resulting positive electrode had a density of an active mass of 3.60 g/cc.

The surface roughness Ra and Rq of the positive electrodes according to Examples 11 and 12 and Comparative Example 5 were measured, and the results are shown in Table 5. For reference, the surface roughness Ra and Rq was measured, and the results are presented in Table 5.

TABLE 5

| Positive electrode precursor | | Comparative Example 5 | | Example 11 | | Example 12 | |
|---|---|---|---|---|---|---|---|
| Ra(nm) | Rq(nm) | Ra(nm) | Rq(nm) | Ra(nm) | Rq(nm) | Ra(nm) | Rq (nm) |
| 1562 | 2202 | 425 | 599 | 256 | 356 | 150 | 210 |

It is shown from Table 5 that the surface roughness Ra and Rq, according to Examples 11 and 12, are substantially lower than the surface roughness of Comparative Example 5.

EXAMPLE 13

A positive electrode was produced by the same procedure as in Example 11, except that the positive electrode precursor prepared by Example 11 was pressurized using a pressurizer with a surface roughness Ra of 10 nm and Rq of 12 nm, to obtain a density of the active mass of 3.0 g/cc.

EXAMPLE 14

A positive electrode was produced by the same procedure as in Example 13, except that the pressurizing operation was performed until a density of the active mass reached 3.3 g/cc.

EXAMPLE 15

A positive electrode was produced by the same procedure as in Example 13, except that the pressurizing operation was performed until a density of the active mass reached 3.9 g/cc.

COMPARATIVE EXAMPLE 6

A positive electrode was produced by the same procedure as in Example 13, except that the pressurizing operation was performed until a density of the active mass reached 4.2 g/cc.

The surface roughness of the positive electrodes according to Examples 13 to 15 and Comparative Example 6 were measured, and the results are presented in Table 6. Furthermore, in order to identify the effect of the density of the active mass on the surface roughness Ra and Rq, the surface roughness Ra and Rq of Example 12 are also shown in Table 6. For reference, the surface roughness Ra and Rq of the positive electrode precursor is presented in Table 6. In Table 6, the units of the Ra and Rq are nm.

TABLE 6

|  | Ra | Rq | Density of active mass (g/cc) |
|---|---|---|---|
| Positive electrode precursor | 1562 | 2202 | — |
| Example 13 | 312 | 440 | 3.0 |
| Example 14 | 225 | 311 | 3.3 |
| Example 12 | 150 | 210 | 3.6 |
| Example 15 | 141 | 196 | 3.9 |
| Comparative Example 6 | 128 | 184 | 4.2 |

As shown in Table 6, as the density of the active mass increases, the surface roughness Ra and Rq decreases.

II. Fabrication of Cells

\* The use of $LiCoO_2$ Positive Active Material

EXAMPLES 16 to 23 and COMPARATIVE EXAMPLE 7

Using the positive electrodes according to Examples 1 and 2 and Comparative Example 1, and the negative electrodes according to Examples 3 and 4 and Comparative Example 2, rechargeable lithium cells were fabricated as shown in Table 7. As an electrolyte, 1.0 M $LiPF_6$ in a mixed solvent of ethylene carbonate, dimethyl carbonate and ethyl methyl carbonate (having a 3:4:4 volume ratio) was used. The fabricated cell had a height of 4.5 cm, a width of 3.7 cm, and a thickness of 0.4 cm, and exhibited a nominal capacity of 650 mAh.

\* Measurement of Capacity and Cycle Life Characteristics.

The cells according to Examples 16 to 23, and Comparative Example 7 were charged and discharged at 0.2 C (formation operation), and then charged at 0.5 C and discharged at 0.2 C (standard operation). After the standard operation was performed, the discharge capacity was measured, and the results are presented in Table 7.

In addition, the resulting cells in which the standard operation was performed were charged and discharged at 1.0 C for 100 times and 300 times, respectively, and the capacity retention (cycle life characteristic: capacity for $300^{th}$ to the nominal capacity) was measured. The results are also shown in Table 7. The very thick positive electrode precursor and the negative electrode precursor caused the fabricated cells to exhibit capacities that were so low that they were insignificant, as is shown in Table 7.

TABLE 7

|  | Positive electrode | Negative electrode | Discharge Capacity (mAh) | Capacity retention (%) |
|---|---|---|---|---|
| Comparative Example 7 | Comparative Example 1 | Comparative Example 2 | 642 | 67 |
| Example 16 | Comparative Example 1 | Example 3 | 650 | 70 |
| Example 17 | Comparative Example 1 | Example 4 | 651 | 73 |
| Example 18 | Example 1 | Comparative Example 2 | 647 | 72 |
| Example 19 | Example 1 | Example 3 | 660 | 79 |
| Example 20 | Example 1 | Example 4 | 658 | 81 |
| Example 21 | Example 2 | Comparative Example 2 | 647 | 75 |
| Example 22 | Example 2 | Example 3 | 661 | 82 |
| Example 23 | Example 2 | Example 4 | 665 | 86 |

It is evident from Table 7 that, as the surface roughness of the electrode decreases, the cycle life characteristics improve in correspondence with the same density of the active mass.

\* Measurement of Surface Roughness

After the formation operation and the standard operation, the cells according to Examples 16 to 23 and Comparative Example 7 were disassembled, and then the positive electrode and the negative electrode were collected. The surface roughness of the positive electrode and the negative electrode were measured, and the results are shown in Table 8. In addition, after the cycle life charge and discharge was performed for 100 times and 300 times, the surface roughness of the positive electrode and the negative electrode were measured, and the results are also presented in Table 8. The characteristics of the surface at the edge portion or the folding portion may be modified as the repeated charging and discharging progresses. Thus, as shown in FIG. 2, a central portion from the positive electrode was sampled by the following procedure, and the surface roughness was measured.

The central portion was a portion corresponding to 60% of the positive electrode, with the exception of right and left 20% portions, when the total longitudinal direction length of the positive electrode is 100%, and with the exception of upper and lower 20% portions, when the total horizontal direction width of the positive electrode is 100%. In addition, the central portion did not include the folded portion where the electrode was wound. The central portion was controlled to have a horizontal length of 5 cm and a vertical length 3 cm.

The central portion of the electrode was washed with 150 ml of a dimethyl carbonate solvent for 2 minutes and taken from the solvent. The resulting electrode was dried at 40° C. under a vacuum of $1 \times 10^{-4}$ torr for 1 hour, and the surface roughness was measured.

TABLE 8

|  |  |  | Co 7 | Ex 16 | Ex 17 | Ex 18 | Ex 19 | Ex 20 | Ex 21 | Ex 22 | Ex 23 |
|---|---|---|---|---|---|---|---|---|---|---|---|
| Prior to assembly | Positive | Ra (nm) | 553 | 553 | 553 | 359 | 359 | 359 | 181 | 181 | 181 |
|  |  | Rq (nm) | 780 | 780 | 780 | 499 | 499 | 499 | 250 | 250 | 250 |
|  | Negative | Ra (nm) | 1524 | 965 | 179 | 1524 | 965 | 179 | 1524 | 965 | 179 |
|  |  | Rq (nm) | 1996 | 1245 | 234 | 1996 | 1245 | 234 | 1996 | 1245 | 234 |
| After formation | Positive | Ra (nm) | 623 | 620 | 618 | 419 | 412 | 385 | 210 | 204 | 200 |

TABLE 8-continued

|  |  |  | Co 7 | Ex 16 | Ex 17 | Ex 18 | Ex 19 | Ex 20 | Ex 21 | Ex 22 | Ex 23 |
|---|---|---|---|---|---|---|---|---|---|---|---|
| and Standard operations | Negative | Rq (nm) | 878 | 868 | 871 | 591 | 577 | 535 | 296 | 290 | 278 |
|  |  | Ra (nm) | 1916 | 1157 | 206 | 1906 | 1150 | 202 | 1900 | 1141 | 196 |
|  |  | Rq (nm) | 2510 | 1516 | 272 | 2478 | 1507 | 269 | 2508 | 1483 | 255 |
| Cycle life charge and discharge for $100^{th}$ cycle | Positive | Ra (nm) | 683 | 680 | 676 | 464 | 454 | 431 | 234 | 226 | 223 |
|  |  | Rq (nm) | 963 | 959 | 960 | 654 | 636 | 599 | 330 | 321 | 310 |
|  | Negative | Ra (nm) | 2121 | 1284 | 231 | 2116 | 1270 | 225 | 2105 | 1261 | 221 |
|  |  | Rq (nm) | 2800 | 1669 | 305 | 2751 | 1676 | 295 | 2779 | 1639 | 285 |
| Cycle life charge and discharge for $300^{th}$ cycle | Positive | Ra (nm) | 756 | 750 | 743 | 306 | 294 | 279 | 260 | 251 | 246 |
|  |  | Rq (nm) | 1074 | 1050 | 1048 | 431 | 412 | 388 | 364 | 354 | 342 |
|  | Negative | Ra (nm) | 2324 | 1412 | 258 | 2316 | 1406 | 250 | 2305 | 1394 | 245 |
|  |  | Rq (nm) | 3068 | 1878 | 341 | 3011 | 1842 | 333 | 3043 | 1826 | 323 |

*Positive refers to Positive electrode
*Negative: refers to Negative electrode
*Co refers to Comparative Example
*Ex refers to Example It is evident from Table 8 that, as the charge and discharge are repeated, the surface roughness of the positive electrode and the negative electrode increases.

EXAMPLES 24 to 47 and COMPARATIVE EXAMPLE 8

Using, the positive electrodes according to Examples 2, 5 to 7 and Comparative Example 3, and the negative electrode according to Examples 3, 8 to 10 and Comparative Example 4, rechargeable lithium cells were fabricated as shown in Table 9. As an electrolyte, 1.0 M $LiPF_6$ in a mixed solvent of ethylene carbonate, dimethyl carbonate, and ethyl methyl carbonate (having a 3:4:4 volume ratio) was used. The fabricated cell had a height of 4.5 cm, a width of 3.7 cm, and a thickness of 0.4 cm, and exhibited a nominal capacity of 650 mAh.

* Measurement of capacity and Cycle Life Characteristics.

The formation operation and the standard operation were performed on the cells according to Examples 24 to 37, and Comparative Example 8 and the cycle life charging and discharging were performed under the same conditions as in the above Examples. The discharge capacity was measured at the $3^{rd}$ cycle during the standard operation, and the value is shown in Table 9 as a capacity. After the charging and the discharging were performed 300 times, the capacity retention (cycle life characteristic: capacity for $300^{th}$ to the nominal capacity) was measured and is also presented in Table 9. The very thick positive electrode precursor and the negative electrode precursor caused the fabricated cells to exhibit capacities that were so low that they were insignificant, as shown in Table 9.

TABLE 9

| | Positive electrode | Negative electrode | Discharge Capacity (mAh) | Capacity retention (%) |
|---|---|---|---|---|
| Example 24 | Example 5 | Example 8 | 653 | 79 |
| Example 25 | Example 5 | Example 9 | 656 | 80 |
| Example 26 | Example 5 | Example 3 | 659 | 82 |
| Example 27 | Example 5 | Example 10 | 651 | 76 |
| Example 28 | Example 5 | Comparative Example 4 | 650 | 68 |
| Example 29 | Example 6 | Example 8 | 661 | 82 |
| Example 30 | Example 6 | Example 9 | 662 | 83 |
| Example 31 | Example 6 | Example 3 | 664 | 85 |
| Example 32 | Example 6 | Example 10 | 660 | 81 |
| Example 33 | Example 6 | Comparative Example 4 | 658 | 65 |
| Example 34 | Example 2 | Example 8 | 664 | 84 |
| Example 35 | Example 2 | Example 9 | 664 | 85 |
| Example 36 | Example 2 | Example 3 | 665 | 86 |
| Example 37 | Example 2 | Example 10 | 659 | 80 |
| Example 38 | Example 2 | Comparative Example 4 | 655 | 63 |
| Example 39 | Example 7 | Example 8 | 653 | 80 |
| Example 40 | Example 7 | Example 9 | 655 | 81 |
| Example 41 | Example 7 | Example 3 | 660 | 82 |
| Example 42 | Example 7 | Example 10 | 652 | 76 |
| Example 43 | Example 7 | Comparative Example 4 | 650 | 61 |
| Example 44 | Comparative Example 3 | Example 8 | 650 | 70 |
| Example 45 | Comparative Example 3 | Example 9 | 651 | 64 |
| Example 46 | Comparative Example 3 | Example 3 | 654 | 58 |
| Example 47 | Comparative Example 3 | Example 10 | 648 | 49 |
| Comparative Example 8 | Comparative Example 3 | Comparative Example 4 | 645 | 46 |

It is evident from Table 9 that the density of 3.9 or more of the positive electrode and 2.0 or more of the negative electrode causes a decrease in the cycle life characteristic. The higher density of the active mass decreases the surface roughness of the electrode, but too high a density deteriorates the cycle life characteristics, even though the surface roughness decreases.

\* Measurement of Surface Roughness

After the formation operation and the standard operation, the cells according to Examples 24 to 47 and Comparative Example 8 were disassembled, and then the positive electrode and the negative electrode were collected. The surface roughness of the positive electrode and the negative electrode were measured, and the results are shown in Tables 10 to 12. In addition, after the cycle life charge and discharge was performed for 100 times and 300 times, the surface roughness of the positive electrode and the negative electrode were measured and the results are also presented in Tables 10 to 12. The surface roughness was measured under the same conditions as with the above Examples. In Tables 10 to 12, Positive refers to positive electrode, Negative: refers to negative electrode, Ex refers to Example, and Co refers to Comparative Example.

TABLE 10

|  |  |  | Ex 24 | Ex 25 | Ex 26 | Ex 27 | Ex 28 | Ex 29 | Ex 30 | Ex 31 |
|---|---|---|---|---|---|---|---|---|---|---|
| Prior to assembly | Positive | Ra (nm) | 265 | 265 | 265 | 265 | 265 | 214 | 214 | 214 |
|  |  | Rq (nm) | 376 | 376 | 376 | 376 | 376 | 297 | 297 | 297 |
|  | Negative | Ra (nm) | 256 | 210 | 179 | 165 | 149 | 256 | 210 | 179 |
|  |  | Rq (nm) | 335 | 277 | 234 | 211 | 188 | 335 | 277 | 234 |
| After formation/ standard | Positive | Ra (nm) | 293 | 296 | 297 | 299 | 302 | 234 | 237 | 240 |
|  |  | Rq (nm) | 413 | 414 | 416 | 422 | 423 | 330 | 332 | 338 |
|  | Negative | Ra (nm) | 281 | 231 | 194 | 185 | 169 | 283 | 233 | 295 |
|  |  | Rq (nm) | 368 | 303 | 256 | 242 | 221 | 371 | 305 | 389 |
| Cycle life charge and discharge for $100^{th}$ cycle | Positive | Ra (nm) | 323 | 325 | 326 | 329 | 331 | 257 | 258 | 259 |
|  |  | Rq (nm) | 455 | 465 | 463 | 464 | 463 | 362 | 366 | 368 |
|  | Negative | Ra (nm) | 309 | 255 | 214 | 204 | 187 | 311 | 257 | 214 |
|  |  | Rq (nm) | 408 | 332 | 282 | 371 | 247 | 411 | 334 | 282 |
| Cycle life charge and discharge for $300^{th}$ cycle | Positive | Ra (nm) | 355 | 356 | 358 | 363 | 271 | 283 | 285 | 286 |
|  |  | Rq (nm) | 504 | 506 | 505 | 512 | 519 | 405 | 399 | 403 |
|  | Negative | Ra (nm) | 340 | 281 | 235 | 225 | 206 | 343 | 272 | 235 |
|  |  | Rq (nm) | 456 | 374 | 310 | 293 | 270 | 453 | 356 | 310 |

TABLE 11

|  |  |  | Ex 32 | Ex 33 | Ex 34 | Ex 35 | Ex 36 | Ex 37 | Ex 38 | Ex 39 |
|---|---|---|---|---|---|---|---|---|---|---|
| Prior to assembly | Positive | Ra (nm) | 214 | 214 | 181 | 181 | 181 | 181 | 181 | 167 |
|  |  | Rq (nm) | 297 | 297 | 250 | 250 | 250 | 250 | 250 | 229 |
|  | Negative | Ra (nm) | 165 | 149 | 256 | 210 | 179 | 165 | 149 | 256 |
|  |  | Rq (nm) | 211 | 188 | 335 | 277 | 234 | 211 | 188 | 335 |
| After formation/ standard | Positive | Ra (nm) | 241 | 243 | 194 | 197 | 200 | 202 | 206 | 185 |
|  |  | Rq (nm) | 337 | 340 | 274 | 276 | 278 | 285 | 288 | 261 |
|  | Negative | Ra (nm) | 183 | 167 | 284 | 235 | 196 | 186 | 168 | 289 |
|  |  | Rq (nm) | 238 | 219 | 375 | 308 | 255 | 242 | 220 | 379 |
| Cycle life charge and discharge for $100^{th}$ cycle | Positive | Ra (nm) | 263 | 267 | 218 | 221 | 223 | 230 | 236 | 203 |
|  |  | Rq (nm) | 371 | 374 | 310 | 312 | 310 | 324 | 330 | 286 |
|  | Negative | Ra (nm) | 200 | 184 | 312 | 260 | 221 | 205 | 185 | 319 |
|  |  | Rq (nm) | 264 | 243 | 412 | 338 | 285 | 267 | 244 | 421 |

TABLE 11-continued

|  |  |  | Ex 32 | Ex 33 | Ex 34 | Ex 35 | Ex 36 | Ex 37 | Ex 38 | Ex 39 |
|---|---|---|---|---|---|---|---|---|---|---|
| Cycle life charge and discharge for 300$^{th}$ cycle | Positive | Ra (nm) | 291 | 299 | 240 | 243 | 246 | 253 | 259 | 223 |
|  |  | Rq (nm) | 410 | 425 | 341 | 340 | 342 | 357 | 363 | 317 |
|  | Negative | Ra (nm) | 221 | 202 | 343 | 286 | 245 | 226 | 203 | 351 |
|  |  | Rq (nm) | 287 | 265 | 449 | 380 | 323 | 294 | 266 | 463 |

TABLE 12

|  |  |  | Ex 40 | Ex 41 | Ex 42 | Ex 43 | Ex 44 | Ex 45 | Ex 46 | Ex 47 | Co 8 |
|---|---|---|---|---|---|---|---|---|---|---|---|
| Prior to assembly | Positive | Ra(nm) | 167 | 167 | 167 | 167 | 151 | 151 | 151 | 151 | 151 |
|  |  | Rq(nm) | 229 | 229 | 229 | 229 | 216 | 216 | 216 | 216 | 216 |
|  | Negative | Ra(nm) | 210 | 179 | 165 | 149 | 256 | 210 | 179 | 165 | 149 |
|  |  | Rq(nm) | 277 | 234 | 211 | 188 | 335 | 277 | 234 | 211 | 188 |
| After formation/ standard | Positive | Ra(nm) | 187 | 189 | 193 | 196 | 167 | 170 | 172 | 174 | 176 |
|  |  | Rq(nm) | 266 | 266 | 272 | 274 | 239 | 238 | 243 | 245 | 246 |
|  | Negative | Ra(nm) | 240 | 198 | 191 | 172 | 295 | 246 | 203 | 195 | 179 |
|  |  | Rq(nm) | 314 | 263 | 248 | 225 | 386 | 322 | 272 | 254 | 234 |
| Cycle life charge and discharge for 100$^{th}$ cycle | Positive | Ra(nm) | 204 | 206 | 210 | 214 | 184 | 185 | 187 | 192 | 198 |
|  |  | Rq(nm) | 294 | 293 | 296 | 300 | 259 | 259 | 266 | 271 | 277 |
|  | Negative | Ra(nm) | 263 | 218 | 210 | 189 | 324 | 271 | 223 | 214 | 197 |
|  |  | Rq(nm) | 347 | 288 | 273 | 249 | 428 | 355 | 294 | 278 | 260 |
| Cycle life charge and discharge for 300$^{th}$ cycle | Positive | Ra(nm) | 225 | 226 | 230 | 238 | 202 | 203 | 204 | 210 | 215 |
|  |  | Rq(nm) | 320 | 319 | 324 | 333 | 287 | 286 | 288 | 296 | 301 |
|  | Negative | Ra(nm) | 289 | 240 | 233 | 210 | 356 | 298 | 245 | 235 | 220 |
|  |  | Rq(nm) | 381 | 317 | 303 | 275 | 470 | 396 | 326 | 306 | 288 |

As shown in Tables 10 to 12, the repeated charge and discharge cycles increase the surface roughness of the positive electrode and the negative electrode.

* The use of $LiNi_{0.8}Co_{0.1}Mn_{0.1}O_2$ Positive Active Material

EXAMPLES 48 to 55 and COMPARATIVE EXAMPLE 9

Using the positive electrodes according to Examples 11 and 12 and Comparative Example 5, and the negative electrode according to Examples 3 to 4 and Comparative Example 2, rechargeable lithium cells were fabricated as shown in Table 13. As an electrolyte, 1.0 M $LiPF_6$ in a mixed solvent of ethylene carbonate, dimethyl carbonate, and ethyl methyl carbonate (having a 3:4:4 volume ratio) was used. The fabricated cell had a height of 4.5 cm, a width of 3.7 cm, and a thickness of 0.4 cm, and exhibited a nominal capacity of 650 mAh.

* Measurement of capacity and Cycle Life Characteristics.

The formation operation and the standard operation were performed on the cells according to Examples 48 to 55 and Comparative Example 9, and the cycle life charging and discharging were performed under the same conditions as with the above Examples. The discharge capacity was measured at the 3$^{rd}$ cycles during the standard operation and the value is shown in Table 13 as a capacity. After the charging and the discharging were performed 300 times, the capacity retention (cycle life characteristic: capacity for 300$^{th}$ to the nominal capacity) was measured and is also presented in Table 13. The very thick positive electrode precursor and the negative electrode precursor caused the fabricated cells to exhibit capacities that were so low that they were insignificant, as shown in Table 13.

TABLE 13

| | Positive electrode | Negative electrode | Discharge Capacity (mAh) | Capacity retention (%) |
|---|---|---|---|---|
| Comparative Example 9 | Comparative Example 5 | Comparative Example 2 | 640 | 65 |
| Example 48 | Comparative Example 5 | Example 3 | 648 | 69 |
| Example 49 | Comparative Example 5 | Example 4 | 647 | 71 |
| Example 50 | Example 11 | Comparative Example 2 | 645 | 70 |
| Example 51 | Example 11 | Example 3 | 645 | 77 |
| Example 52 | Example 11 | Example 4 | 658 | 79 |
| Example 53 | Example 12 | Comparative Example 2 | 655 | 73 |
| Example 54 | Example 12 | Example 3 | 644 | 80 |
| Example 55 | Example 12 | Example 4 | 660 | 84 |

It is evident from Table 13 that as the surface roughness of the electrode decreases, the cycle life characteristics improve in accordance with the same density of the active mass.

* Measurement of Surface Roughness

After the formation operation and the standard operation, the cells according to Examples 48 to 55 and Comparative Example 9 were disassembled, and then the positive electrode and the negative electrode were collected. The surface roughness of the positive electrode and the negative electrode were measured, and the results are shown in Tables 14. In addition, after the cycle life charge and discharge was performed for 100 times and 300 times, the surface roughness of the positive electrode and the negative electrode were measured, and the results are also presented in Tables 14. The surface roughness was measured under the same conditions as the above Examples.

electrode precursor caused the fabricated cells to exhibit capacities that were so low that they were insignificant, as shown in Table 15.

TABLE 14

| | | | Co 9 | Ex 48 | Ex 49 | Ex 50 | Ex 51 | Ex 52 | Ex 53 | Ex 54 | Ex 55 |
|---|---|---|---|---|---|---|---|---|---|---|---|
| Prior to assembly | Positive | Ra(nm) | 425 | 425 | 425 | 256 | 256 | 256 | 150 | 150 | 150 |
| | | Rq(nm) | 599 | 599 | 599 | 356 | 356 | 356 | 210 | 210 | 210 |
| | Negative | Ra(nm) | 1524 | 965 | 179 | 1524 | 965 | 179 | 1524 | 965 | 179 |
| | | Rq(nm) | 1996 | 1245 | 234 | 1996 | 1245 | 234 | 1996 | 1245 | 234 |
| After formation/ standard | Positive | Ra(nm) | 490 | 486 | 482 | 286 | 283 | 281 | 174 | 171 | 166 |
| | | Rq(nm) | 691 | 680 | 680 | 403 | 396 | 391 | 245 | 243 | 231 |
| | Negative | Ra(nm) | 1920 | 1159 | 209 | 1911 | 1155 | 208 | 1910 | 1144 | 199 |
| | | Rq(nm) | 2515 | 1518 | 276 | 2484 | 1513 | 277 | 2521 | 1487 | 259 |
| Cycle life charge and discharge for $100^{th}$ cycle | Positive | Ra(nm) | 546 | 543 | 540 | 315 | 310 | 306 | 191 | 189 | 185 |
| | | Rq(nm) | 775 | 766 | 767 | 450 | 434 | 425 | 269 | 268 | 257 |
| | Negative | Ra(nm) | 2129 | 1293 | 237 | 2122 | 1281 | 229 | 2111 | 1269 | 227 |
| | | Rq(nm) | 2810 | 1681 | 308 | 2759 | 1691 | 305 | 2787 | 1650 | 293 |
| Cycle life charge and discharge for $300^{th}$ cycle | Positive | Ra(nm) | 613 | 609 | 602 | 346 | 342 | 339 | 211 | 209 | 205 |
| | | Rq(nm) | 864 | 853 | 849 | 488 | 482 | 471 | 295 | 295 | 289 |
| | Negative | Ra(nm) | 2330 | 1422 | 264 | 2331 | 1411 | 258 | 2314 | 1404 | 253 |
| | | Rq(nm) | 3076 | 1891 | 341 | 3030 | 1848 | 343 | 3101 | 1839 | 334 |

*Positive refers to Positive electrode
*Negative: refers to Negative electrode
*Co refers to Comparative Example
*Ex refers to Example As shown in Table 14, as the charge and discharge are repeated, the surface roughness of the positive electrode and the negative electrode increases.

EXAMPLES 56 to 79 and COMPARATIVE EXAMPLE 10

Using the positive electrodes according to Examples 12 to 15 and Comparative Example 6, and the negative electrode according to Examples 3, 8 to 10 and Comparative Example 4, rechargeable lithium cells were fabricated as shown in Table 15. As an electrolyte, 1.0 M $LiPF_6$ in a mixed solvent of ethylene carbonate, dimethyl carbonate and ethyl methyl carbonate (having a 3:4:4 volume ratio) was used. The fabricated cell had a height of 4.5 cm, a width of 3.7 cm, and a thickness of 0.4 cm, and exhibited a nominal capacity of 650 mAh.

* Measurement of Capacity and Cycle Life Characteristics.

The formation operation and the standard operation were performed on the cells according to Examples 56 to 79, and Comparative Example 10, and the cycle life charging and discharging were performed under the same conditions as the above Examples. The discharge capacity was measured at the $3^{rd}$ cycles during the standard operation, and the value is shown in Table 15 as a capacity. After the charging and the discharging were performed for 300 times, the capacity retention (cycle life characteristic: capacity for $300^{th}$ to the nominal capacity) was measured and is also presented in Table 15. The very thick positive electrode precursor and the negative

TABLE 15

| | Positive electrode | Negative electrode | Discharge Capacity (mAh) | Capacity retention (%) |
|---|---|---|---|---|
| Example 56 | Example 13 | Example 8 | 651 | 76 |
| Example 57 | Example 13 | Example 9 | 653 | 77 |
| Example 58 | Example 13 | Example 3 | 656 | 79 |
| Example 59 | Example 13 | Example 10 | 649 | 74 |
| Example 60 | Example 13 | Comparative Example 4 | 645 | 65 |
| Example 61 | Example 14 | Example 8 | 657 | 80 |
| Example 62 | Example 14 | Example 9 | 660 | 81 |
| Example 63 | Example 14 | Example 3 | 662 | 82 |
| Example 64 | Example 14 | Example 10 | 658 | 78 |
| Example 65 | Example 14 | Comparative Example 4 | 655 | 63 |
| Example 66 | Example 12 | Example 8 | 660 | 82 |
| Example 67 | Example 12 | Example 9 | 661 | 83 |
| Example 68 | Example 12 | Example 3 | 660 | 84 |
| Example 69 | Example 12 | Example 10 | 655 | 77 |
| Example 70 | Example 12 | Comparative Example 4 | 652 | 60 |
| Example 71 | Example 15 | Example 8 | 650 | 78 |
| Example 72 | Example 15 | Example 9 | 652 | 79 |
| Example 73 | Example 15 | Example 3 | 657 | 80 |
| Example 74 | Example 15 | Example 10 | 650 | 73 |
| Example 75 | Example 15 | Comparative Example 4 | 647 | 58 |
| Example 76 | Comparative Example 6 | Example 8 | 646 | 66 |
| Example 77 | Comparative Example 6 | Example 9 | 648 | 62 |
| Example 78 | Comparative Example 6 | Example 3 | 650 | 55 |
| Example 79 | Comparative Example 6 | Example 10 | 644 | 45 |
| Comparative Example 10 | Comparative Example 6 | Comparative Example 4 | 642 | 43 |

It is evident from Table 9 that the density of 4.2 or more of the positive electrode and 2.3 or more of the negative electrode causes a decrease in the cycle life characteristic. The higher density of the active mass decreases the surface roughness of the electrode, but too high a density deteriorates the cycle life characteristics, even though the surface roughness decreases.

* Measurement of Surface Roughness

After the formation operation and the standard operation, the cells according to Examples 56 to 79 and Comparative Example 10 were disassembled, and then the positive electrode and the negative electrode were collected. The surface roughness of the positive electrode and the negative electrode were measured, and the results are shown in Tables 16 to 18. In addition, after the cycle life charge and discharge was performed for 100 times and 300 times, the surface roughness of the positive electrode and the negative electrode were measured, and the results are also presented in Tables 16 to 18. The surface roughness was measured under the same conditions as with the above Examples. In Tables 16 to 18, Positive refers to positive electrode, Negative: refers to negative electrode, Ex refers to Example, and Co refers to Comparative Example.

TABLE 16

|  |  |  | Ex 56 | Ex 57 | Ex 58 | Ex 59 | Ex 60 | Ex 61 | Ex 62 | Ex 63 |
|---|---|---|---|---|---|---|---|---|---|---|
| Before assembly | Positive | Ra (nm) | 312 | 312 | 312 | 312 | 312 | 225 | 225 | 225 |
|  |  | Rq (nm) | 440 | 440 | 440 | 440 | 440 | 311 | 311 | 311 |
|  | Negative | Ra (nm) | 256 | 210 | 179 | 165 | 149 | 256 | 210 | 179 |
|  |  | Rq (nm) | 335 | 277 | 234 | 211 | 188 | 335 | 277 | 234 |
| After formation/ Standard | Positive | Ra (nm) | 346 | 344 | 343 | 351 | 356 | 247 | 245 | 243 |
|  |  | Rq (nm) | 488 | 482 | 480 | 495 | 498 | 348 | 343 | 343 |
|  | Negative | Ra (nm) | 284 | 235 | 297 | 189 | 171 | 287 | 236 | 197 |
|  |  | Rq (nm) | 372 | 308 | 392 | 248 | 224 | 376 | 309 | 260 |
| Cycle life charge and discharge for $100^{th}$ cycle | Positive | Ra (nm) | 382 | 379 | 381 | 385 | 391 | 272 | 270 | 266 |
|  |  | Rq (nm) | 539 | 542 | 541 | 543 | 547 | 384 | 383 | 378 |
|  | Negative | Ra (nm) | 315 | 262 | 220 | 211 | 193 | 319 | 263 | 222 |
|  |  | Rq (nm) | 416 | 341 | 290 | 281 | 255 | 421 | 342 | 293 |
| Cycle life charge and discharge for $300^{th}$ cycle | Positive | Ra (nm) | 420 | 417 | 416 | 426 | 433 | 300 | 297 | 295 |
|  |  | Rq (nm) | 596 | 592 | 587 | 601 | 606 | 429 | 416 | 416 |
|  | Negative | Ra (nm) | 348 | 293 | 245 | 234 | 215 | 353 | 282 | 246 |
|  |  | Rq (nm) | 466 | 390 | 323 | 304 | 282 | 466 | 369 | 325 |

TABLE 17

|  |  |  | Ex 64 | Ex 65 | Ex 66 | Ex 67 | Ex 68 | Ex 69 | Ex 70 | Ex 71 | Ex 72 |
|---|---|---|---|---|---|---|---|---|---|---|---|
| Before assembly | Positive | Ra (nm) | 225 | 225 | 150 | 150 | 150 | 150 | 150 | 141 | 141 |
|  |  | Rq (nm) | 311 | 311 | 210 | 210 | 210 | 210 | 210 | 196 | 196 |
|  | Negative | Ra (nm) | 165 | 149 | 256 | 210 | 179 | 165 | 149 | 256 | 210 |
|  |  | Rq (nm) | 211 | 188 | 335 | 277 | 234 | 211 | 188 | 335 | 277 |
| After formation/ Standard | Positive | Ra (nm) | 250 | 256 | 168 | 167 | 166 | 170 | 173 | 157 | 156 |
|  |  | Rq (nm) | 350 | 358 | 237 | 234 | 231 | 240 | 242 | 221 | 222 |
|  | Negative | Ra (nm) | 186 | 171 | 289 | 237 | 199 | 189 | 174 | 291 | 245 |
|  |  | Rq (nm) | 242 | 224 | 381 | 310 | 259 | 246 | 228 | 381 | 321 |
| Cycle life charge and discharge for $100^{th}$ cycle | Positive | Ra (nm) | 276 | 283 | 186 | 186 | 185 | 187 | 191 | 173 | 171 |
|  |  | Rq (nm) | 389 | 396 | 264 | 262 | 257 | 264 | 267 | 244 | 246 |
|  | Negative | Ra (nm) | 209 | 191 | 319 | 267 | 227 | 211 | 190 | 325 | 269 |

TABLE 17-continued

|  |  |  | Ex 64 | Ex 65 | Ex 66 | Ex 67 | Ex 68 | Ex 69 | Ex 70 | Ex 71 | Ex 72 |
|---|---|---|---|---|---|---|---|---|---|---|---|
|  |  | Rq (nm) | 276 | 252 | 421 | 347 | 293 | 274 | 251 | 429 | 355 |
| Cycle life charge and discharge for 300$^{th}$ cycle | Positive | Ra (nm) | 303 | 310 | 207 | 205 | 205 | 208 | 211 | 190 | 189 |
|  |  | Rq (nm) | 427 | 440 | 294 | 287 | 289 | 293 | 295 | 270 | 268 |
|  | Negative | Ra (nm) | 231 | 211 | 354 | 297 | 253 | 236 | 213 | 359 | 299 |
|  |  | Rq (nm) | 300 | 276 | 464 | 395 | 334 | 307 | 279 | 474 | 395 |

TABLE 18

|  |  |  | Ex 73 | Ex 74 | Ex 75 | Ex 76 | Ex 77 | Ex 78 | Ex 79 | Co 9 |
|---|---|---|---|---|---|---|---|---|---|---|
| Before assembly | Positive | Ra (nm) | 141 | 141 | 141 | 128 | 128 | 128 | 128 | 128 |
|  |  | Rq (nm) | 196 | 196 | 196 | 184 | 184 | 184 | 184 | 184 |
|  | Negative | Ra (nm) | 179 | 165 | 149 | 256 | 210 | 179 | 165 | 149 |
|  |  | Rq (nm) | 234 | 211 | 188 | 335 | 277 | 234 | 211 | 188 |
| After formation/ Standard | Positive | Ra (nm) | 155 | 163 | 169 | 144 | 142 | 141 | 150 | 156 |
|  |  | Rq (nm) | 219 | 230 | 237 | 206 | 199 | 199 | 212 | 218 |
|  | Negative | Ra (nm) | 203 | 196 | 177 | 300 | 251 | 207 | 199 | 184 |
|  |  | Rq (nm) | 270 | 255 | 232 | 393 | 329 | 277 | 259 | 241 |
| Cycle life charge and discharge for 100$^{th}$ cycle | Positive | Ra (nm) | 170 | 179 | 186 | 158 | 155 | 153 | 165 | 173 |
|  |  | Rq (nm) | 241 | 252 | 260 | 223 | 217 | 217 | 233 | 242 |
|  | Negative | Ra (nm) | 224 | 218 | 196 | 332 | 279 | 228 | 223 | 204 |
|  |  | Rq (nm) | 296 | 283 | 259 | 438 | 365 | 301 | 290 | 269 |
| Cycle life charge and discharge for 300$^{th}$ cycle | Positive | Ra (nm) | 186 | 197 | 203 | 175 | 172 | 171 | 183 | 187 |
|  |  | Rq (nm) | 262 | 278 | 284 | 249 | 243 | 241 | 258 | 262 |
|  | Negative | Ra (nm) | 250 | 244 | 222 | 367 | 312 | 257 | 246 | 240 |
|  |  | Rq (nm) | 330 | 317 | 291 | 484 | 415 | 342 | 320 | 314 |

It is shown in Tables 16 to 18 that the repeated charge and discharge increases the surface roughness of the positive and negative electrodes.

The present invention reduces the surface roughness of the electrode, thus improving the cycle life characteristics from 67% to 86% at the 300$^{th}$ cycle.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A rechargeable lithium battery comprising:
   a positive electrode comprising a positive active material to reversibly intercalate and deintercalate lithium ions;
   a negative electrode comprising a negative active material; and
   an electrolyte comprising a non-aqueous solvent and a lithium salt,
   wherein the arithmetic mean Ra of the surface roughness of the positive electrode is 155 to 419 nm after the rechargeable lithium battery is charged and discharged.

2. The rechargeable lithium battery of claim 1, wherein the arithmetic mean Ra of the surface roughness of the positive electrode is 155 to 385 nm after the rechargeable lithium battery is charged and discharged.

3. The rechargeable lithium battery of claim 1, wherein the root mean square Rq of the surface roughness of the positive electrode is 219 to 591 nm after the rechargeable lithium battery is charged and discharged.

4. The rechargeable lithium battery of claim 3, wherein the root mean square Rq of the surface roughness of the positive electrode is 219 to 535 nm after the rechargeable lithium battery is charged and discharged.

5. The rechargeable lithium battery of claim 1, wherein the arithmetic mean Ra of the surface roughness of the positive electrode is 141 to 359 nm before the rechargeable lithium battery is charged and discharged.

6. The rechargeable lithium battery of claim 5, wherein the arithmetic mean Ra of the surface roughness of the positive electrode is 150 to 300 nm before the rechargeable lithium battery is charged and discharged.

7. The rechargeable lithium battery of claim 1, wherein the root mean square Rq of the surface roughness of the positive electrode is 196 to 500 nm before the rechargeable lithium battery is charged and discharged.

8. The rechargeable lithium battery of claim 1, wherein the root mean square Rq of the surface roughness of the positive electrode is 215 to 450 nm before the rechargeable lithium battery is charged and discharged.

9. The rechargeable lithium battery of claim 1, wherein the charge and the discharge are performed at a charging rate between 0.1 and 2.0 C and a discharging rate between 0.1 and 2.0 C.

10. The rechargeable lithium battery of claim 9, wherein the charge and the discharge are performed at a charging rate between 0.2 and 1.5 C and a discharging rate between 0.2 and 1.5 C.

11. The rechargeable lithium battery of claim 1, wherein the charge and the discharge are performed at a charging current between 0.1 and 5.0 mA/cm² and a discharging current between 0.1 and 5.0 mA/cm².

12. The rechargeable lithium battery of claim 11, wherein the charge and the discharge are performed at a charging current between 0.2 and 4.0 mA/cm² and a discharging current between 0.2 and 4.0 mA/cm².

13. The rechargeable lithium battery of claim 1, wherein the rechargeable lithium battery is presented in a charged condition.

14. The rechargeable lithium battery of claim 1, wherein the rechargeable lithium battery is presented in a condition of being discharged.

15. The rechargeable lithium battery of claim 1, wherein the rechargeable lithium battery has an Open Circuit Voltage (OCV) of 1.0 to 5.5 V.

16. The rechargeable lithium battery of claim 15, wherein the rechargeable lithium battery has an OCV of 1.5 to 4.5 V.

17. The rechargeable lithium battery of claim 1, wherein the positive electrode has a density of 3.0 to 3.90 g/cc.

18. The rechargeable lithium battery of claim 1, wherein the positive active material comprises at least one compound selected from the group consisting of compounds represented by formulas 1 to 18:

$$LiNiO_2 \quad (1)$$

$$LiCoO_2 \quad (2)$$

$$LiMnO_2 \quad (3)$$

$$LiMn_2O_4 \quad (4)$$

$$Li_aNi_bB_cM_dO_2 \quad (5)$$

(wherein $0.90 \leq a \leq 1.1, 0 \leq b \leq 0.9, 0 \leq c \leq 0.5, 0.001 \leq d \leq 0.1$)

$$Li_aNi_bCo_cMn_dM_eO_2 \quad (6)$$

(wherein $0.90 \leq a \leq 1.1, 0 \leq b \leq 0.9, 0 \leq c \leq 0.5, 0 \leq d \leq 0.5, 0.001 \leq e \leq 0.1$)

$$Li_aNiM_bO_2 \quad (7)$$

($0.90 \leq a \leq 1.1, 0.001 \leq b \leq 0.1$)

$$Li_aCoM_bO_2 \quad (8)$$

($0.90 \leq a \leq 1.1, 0.001 \leq b \leq 0.1$)

$$Li_aMnM_bO_2 \quad (9)$$

($0.90 \leq a \leq 1.1, 0.001 \leq b \leq 0.1$)

$$Li_aMn_2M_bO_4 \quad (10)$$

($0.90 \leq a \leq 1.1, 0.001 \leq b \leq 0.1$)

$$DS_2 \quad (11)$$

$$LiDS_2 \quad (12)$$

$$V_2O_5 \quad (13)$$

$$LiV_2O_5 \quad (14)$$

$$LiEO_2 \quad (15)$$

$$LiNiVO_4 \quad (16)$$

$$Li_{(3-x)}F_2(PO_4)_3 (0 \leq x \leq 3) \quad (17)$$

$$Li_{(3-x)}Fe_2(PO_4)_3 (0 \leq x \leq 2) \quad (18)$$

(wherein B is Co or Mn;

D is Ti or Mo;

E is selected from the group consisting of Cr, V, Fe, Sc, and Y;

F is selected from the group consisting of V, Cr, Mn, Co, Ni, and Cu; and

M is at least one transition metal or lanthanide selected from the group consisting of Al, Cr, Mn, Fe, Mg, La, Ce, Sr and V).

19. The rechargeable lithium battery of claim 18, wherein the positive active material comprises a nickel-based compound or a mixture of the nickel-based compound and another compound, wherein the nickel-based compound is at least one compound selected from the group consisting of compounds represented by formulas 1, 5-7, and 16, wherein the another compound is at least one compound selected from the group consisting of compounds represented by formulas 2-4, 8-15, and 17-18, and wherein the arithmetic mean Ra of the surface roughness of the positive electrode is 155 to 356 nm after the rechargeable lithium battery is charged and discharged:

$$LiNiO_2 \quad (1)$$

$$LiCoO_2 \quad (2)$$

$$LiMnO_2 \quad (3)$$

$$LiMn_2O_4 \quad (4)$$

$$Li_aNi_bB_cM_dO_2 \quad (5)$$

($0.90 \leq a \leq 1.1, 0 \leq b \leq 0.9, 0 \leq c \leq 0.5, 0.001 \leq d \leq 0.1$)

$$Li_aNi_bCo_cMn_dM_eO_2 \quad (6)$$

($0.90 \leq a \leq 1.1, 0 \leq b \leq 0.9, 0 \leq c \leq 0.5, 0 \leq d \leq 0.5, 0.001 \leq e \leq 0.1$)

$$Li_aNiM_bO_2 \quad (7)$$

($0.90 \leq a \leq 1.1, 0.001 \leq b \leq 0.1$)

$$Li_aCoM_bO_2 \quad (8)$$

$(0.90 \leq a \leq 1.1, 0.001 \leq b \leq 0.1)$ $$Li_aMnM_bO_2 \quad (9)$$

$(0.90 \leq a \leq 1.1, 0.001 \leq b \leq 0.1)$ $$Li_aMn_2M_bO_4 \quad (10)$$

$(0.90 \leq a \leq 1.1, 0.001 \leq b \leq 0.1)$ $$DS_2 \quad (11)$$

$$LiDS_2 \quad (12)$$

$$V_2O_5 \quad (13)$$

$$LiV_2O_5 \quad (14)$$

$$LiEO_2 \quad (15)$$

$$LiNiVO_4 \quad (16)$$

$$Li_{(3-x)}F_2(PO_4)_3 (0 \leq x \leq 3) \quad (17)$$

$$Li_{(3-x)}Fe_2(PO_4)_3 (0 \leq x \leq 2) \quad (18)$$

(wherein B is Co or Mn;
D is Ti or Mo;
E is selected from the group consisting of Cr, V, Fe, Sc, and Y;
F is selected from the group consisting of V, Cr, Mn, Co, Ni, and Cu; and
M is at least one transition metal or lanthanide selected from the group consisting of Al, Cr, Mn, Fe, Mg, La, Ce, Sr and V).

20. The rechargeable lithium battery of claim 19, wherein the arithmetic mean Ra of the surface roughness of the positive electrode is 155 to 280 nm after the rechargeable lithium battery is charged and discharged.

21. The rechargeable lithium battery of claim 19, wherein the root mean square Rq of the surface roughness of the positive electrode is 219 to 498 nm after the rechargeable lithium battery is charged and discharged.

22. The rechargeable lithium battery of claim 21, wherein the root mean square Rq of the surface roughness of the positive electrode is 219 to 350 nm after the rechargeable lithium battery is charged and discharged.

23. A rechargeable lithium battery comprising:
a positive electrode comprising a positive active material to reversibly intercalate and deintercalate lithium ions;
a negative electrode comprising a negative active material, wherein the negative active material is a carbonaceous material; and
an electrolyte,
wherein the arithmetic mean Ra of the surface roughness of the negative electrode is 183 to 1159 nm after the rechargeable lithium battery is charged and discharged.

24. The rechargeable lithium battery of claim 23, wherein the arithmetic mean Ra of the surface roughness of the negative electrode is 183 to 1141 nm after the rechargeable lithium battery is charged and discharged.

25. The rechargeable lithium battery of claim 23, wherein the root mean square Rq of the surface roughness of the negative electrode is 238 to 1518 nm after the rechargeable lithium battery is charged and discharged.

26. The rechargeable lithium battery of claim 25, wherein the root mean square Rq of the surface roughness of the negative electrode is 238 to 1141 nm after the rechargeable lithium battery is charged and discharged.

27. The rechargeable lithium battery of claim 23, wherein the arithmetic mean Ra of the surface roughness of the negative electrode is 165 to 965 nm before the rechargeable lithium battery is charged and discharged.

28. The rechargeable lithium battery of claim 27, wherein the arithmetic mean Ra of the surface roughness of the negative electrode is 180 to 500 nm before the rechargeable lithium battery is charged and discharged.

29. The rechargeable lithium battery of claim 23, wherein the root mean square Rq of the surface roughness of the negative electrode is 211 to 1250 nm before the rechargeable lithium battery is charged and discharged.

30. The rechargeable lithium battery of claim 29, wherein the root mean square Rq of the surface roughness of the negative electrode is 240 to 700 nm before the rechargeable lithium battery is charged and discharged.

31. The rechargeable lithium battery of claim 23, wherein the charge and the discharge are performed at a charging rate between 0.1 and 2.0 C and a discharging rate between 0.1 and 2.0 C.

32. The rechargeable lithium battery of claim 31, wherein the charge and the discharge are performed at a charging rate between 0.2 and 1.5 C and a discharging rate between 0.2 and 1.5 C.

33. The rechargeable lithium battery of claim 23, wherein the charge and the discharge are performed at a charging current between 0.1 and 5.0 mA/cm$^2$ and a discharging current between 0.1 and 5.0 mA/cm$^2$.

34. The rechargeable lithium battery of claim 33, wherein the charge and the discharge are performed at a charging current between 0.2 and 4.0 mA/cm$^2$ and a discharging current between 0.2 and 4.0 mA/cm$^2$.

35. The rechargeable lithium battery of claim 23, wherein the rechargeable lithium battery is presented in a charged condition.

36. The rechargeable lithium battery of claim 23, wherein the rechargeable lithium battery is presented in a condition of being discharged.

37. The rechargeable lithium battery of claim 23, wherein the rechargeable lithium battery has an Open Circuit Voltage (OCV) of 1.0 to 5.5 V.

38. The rechargeable lithium battery of claim 37, wherein the rechargeable lithium battery has an OCV of 1.5 to 4.5 V.

39. The rechargeable lithium battery of claim 23, wherein the negative electrode has a density of 1.10 to 2.00 g/cc.

40. The rechargeable lithium battery of claim 23, wherein the carbonaceous material has a crystallinity size in a c axis of Lc of at least 20 nm and an exothermic peak of at least 700° C.

41. The rechargeable lithium battery of claim 23, wherein the carbonaceous material is a crystalline carbonaceous material prepared by carbonizing mesophase spherical particles and graphitizing, or a fibrous crystalline carbonaceous material prepared by carbonizing fibrous mesophase pitch and graphitizing.

42. A rechargeable lithium battery comprising:
a positive electrode comprising a positive active material to reversibly intercalate and deintercalate lithium ions;
a negative electrode comprising a negative active material; and
an electrolyte comprising a non-aqueous solvent and a lithium salt,
wherein the arithmetic mean Ra of the surface roughness of the positive electrode is 155 to 419 nm; and the arithmetic mean Ra of the surface roughness of the negative electrode is 183 to 1159 nm, after the rechargeable lithium battery is charged and discharged.

43. The rechargeable lithium battery of claim 42, wherein the arithmetic mean Ra of the surface roughness of the positive electrode is 155 to 385 nm, and the arithmetic mean Ra of the surface roughness of the negative electrode is 183 to 1141 nm, after the rechargeable lithium battery is charged and discharged.

44. The rechargeable lithium battery of claim 42, wherein the root mean square Rq of the surface roughness of the positive electrode is 219 to 591 nm and the root mean square Rq of the surface roughness of the negative electrode is 238 to 1518 nm after the rechargeable lithium battery is charged and discharged.

45. The rechargeable lithium battery of claim 44, wherein the root mean square Rq of the surface roughness of the positive electrode is 219 to 535 nm and the root mean square Rq of the surface roughness of the negative electrode is 238 to 1487 nm after the rechargeable lithium battery is charged and discharged.

46. The rechargeable lithium battery of claim 40, wherein the arithmetic mean Ra of the surface roughness of the positive electrode is 141 to 359 nm and the arithmetic mean Ra of the surface roughness of the negative electrode is 165 to 965 nm before the rechargeable lithium battery is charged and discharged.

47. The rechargeable lithium battery of claim 46, wherein the arithmetic mean Ra of the surface roughness of the positive electrode is 150 to 300 nm and the arithmetic mean Ra of the surface roughness of the negative electrode is 180 to 500 nm before the rechargeable lithium battery is charged and discharged.

48. The rechargeable lithium battery of claim 40, wherein the root mean square Rq of the surface roughness of the positive electrode is 196 to 500 nm and the root mean square Rq of the surface roughness of the negative electrode is 211 to 1250 nm before the rechargeable lithium battery is charged and discharged.

49. The rechargeable lithium battery of claim 48, wherein the root mean square Rq of the surface roughness of the positive electrode is 196 to 450 nm and the root mean square Rq of the surface roughness of the negative electrode is 240 to 700 nm before the rechargeable lithium battery is charged and discharged.

50. The rechargeable lithium battery of claim 40, wherein the charge and the discharge are performed at a charging rate between 0.1 and 2.0 C and a discharging rate between 0.1 and 2.0 C.

51. The rechargeable lithium battery of claim 50, wherein the charge and the discharge are performed at a charging rate between 0.2 and 1.5 C and a discharging rate between 0.2 and 1.5 C.

52. The rechargeable lithium battery of claim 40, wherein the charge and the discharge are performed at a charging current between 0.1 and 5.0 mA/cm$^2$ and a discharging current between 0.1 and 5.0 mA/cm$^2$.

53. The rechargeable lithium battery of claim 52, wherein the charge and the discharge are performed at a charging current between 0.2 and 4.0 mA/cm$^2$ and a discharging current between 0.2 and 4.0 mA/cm$_2$.

54. The rechargeable lithium battery of claim 40, wherein the rechargeable lithium battery is presented in a charged condition.

55. The rechargeable lithium battery of claim 40, wherein the rechargeable lithium battery is presented in a condition of being discharged.

56. The rechargeable lithium battery of claim 40, wherein the rechargeable lithium battery has an Open Circuit Voltage (OCV) of 1.0 to 5.5 V.

57. The rechargeable lithium battery of claim 56, wherein the rechargeable lithium battery has an OCV of 1.5 to 4.5 V.

58. The rechargeable lithium battery of claim 40, wherein the positive electrode has a density of 3.0 to 3.90 g/cc.

59. The rechargeable lithium battery of claim 40, wherein the positive active material comprises at least one compound selected from the group consisting of compounds represented by formulas 1 to 18:

$$LiNiO_2 \qquad (1)$$

$$LiCoO_2 \qquad (2)$$

$$LiMnO_2 \qquad (3)$$

$$LiMn_2O_4 \qquad (4)$$

$$Li_aNi_bB_cM_dO_2 \qquad (5)$$

(wherein $0.90 \leq a \leq 1.1$, $0 \leq b \leq 0.9$, $0 \leq c \leq 0.5$, $0.001 \leq d \leq 0.1$)

$$Li_aNi_bCo_cMn_dM_eO_2 \qquad (6)$$

(wherein $0.90 \leq a \leq 1.1$, $0 \leq b \leq 0.9$, $0 \leq c \leq 0.5$, $0 \leq d \leq 0.5$, $0.001 \leq e \leq 0.1$)

$$Li_aNiM_bO_2 \qquad (7)$$

($0.90 \leq a \leq 1.1$, $0.001 \leq b \leq 0.1$)

$$Li_aCoM_bO_2 \qquad (8)$$

($0.90 \leq a \leq 1.1$, $0.001 \leq b \leq 0.1$)

$$Li_aMnM_bO_2 \qquad (9)$$

($0.90 \leq a \leq 1.1$, $0.001 \leq b \leq 0.1$)

$$Li_aMn_2M_bO_4 \qquad (10)$$

($0.90 \leq a \leq 1.1$, $0.001 \leq b \leq 0.1$)

$$DS_2 \qquad (11)$$

$$LiDS_2 \qquad (12)$$

$$V_2O_5 \qquad (13)$$

$$LiV_2O_5 \qquad (14)$$

$$LiEO_2 \qquad (15)$$

$$LiNiVO_4 \qquad (16)$$

$$Li_{(3-x)}F_2(PO_4)_3 (0 \leq x \leq 3) \qquad (17)$$

$$Li_{(3-x)}Fe_2(PO_4)_3 (0 \leq x \leq 2) \qquad (18)$$

(wherein B is Co or Mn;

D is Ti or Mo;

E is selected from the group consisting of Cr, V, Fe, Sc, and Y;

F is selected from the group consisting of V, Cr, Mn, Co, Ni, and Cu; and

M is at least one transition metal or lanthanide selected from the group consisting of Al, Cr, Mn, Fe, Mg, La, Ce, Sr, and V).

60. The rechargeable lithium battery of claim 59 wherein the positive active material comprises a nickel-based compound or a mixture of the nickel-based compound and another compound, wherein the nickel-based compound is at least one compound selected from the group consisting of compounds represented by formulas 1, 5-7, and 16, wherein the another compound is at least one compound selected from the group consisting of compounds represented by formulas 2-4, 8-15, and 17-18, and wherein the arithmetic mean Ra of the surface roughness of the positive electrode is 155 to 356 nm after the rechargeable lithium battery is charged and discharged:

$$LiNiO_2 \quad (1)$$

$$LiCoO_2 \quad (2)$$

$$LiMnO_2 \quad (3)$$

$$LiMn_2O_4 \quad (4)$$

$$Li_aNi_bB_cM_dO_2 \quad (5)$$

(wherein $0.90 \leq a \leq 1.1, 0 \leq b \leq 0.9, 0 \leq c \leq 0.5, 0.001 \leq d \leq 0.1$)

$$Li_aNi_bCo_cMn_dM_eO_2 \quad (6)$$

(wherein $0.90 \leq a \leq 1.1, 0 \leq b \leq 0.9, 0 \leq c \leq 0.5, 0 \leq d \leq 0.5, 0.001 \leq e \leq 0.1$)

$$Li_aNiM_bO_2 \quad (7)$$

($0.90 \leq a \leq 1.1, 0.001 \leq b \leq 0.1$)

$$Li_aCoM_bO_2 \quad (8)$$

($0.90 \leq a \leq 1.1, 0.001 \leq b \leq 0.1$)

$$Li_aMnM_bO_2 \quad (9)$$

($0.90 \leq a \leq 1.1, 0.001 \leq b \leq 0.1$)

$$Li_aMn_2M_bO_4 \quad (10)$$

($0.90 \leq a \leq 1.1, 0.001 \leq b \leq 0.1$)

$$DS_2 \quad (11)$$

$$LiDS_2 \quad (12)$$

$$V_2O_5 \quad (13)$$

$$LiV_2O_5 \quad (14)$$

$$LiEO_2 \quad (15)$$

$$LiNiVO_4 \quad (16)$$

$$Li_{(3-x)}F_2(PO_4)_3 (0 \leq x \leq 3) \quad (17)$$

$$Li_{(3-x)}Fe_2(PO_4)_3 (0 \leq x \leq 2) \quad (18)$$

(wherein B is Co or Mn;
D is Ti or Mo;
E is selected from the group consisting of Cr, V, Fe, Sc, and Y;
F is selected from the group consisting of V, Cr, Mn, Co, Ni, and Cu; and
M is at least one transition metal or lanthanide selected from the group consisting of Al, Cr, Mn, Fe, Mg, La, Ce, Sr, and V).

61. The rechargeable lithium battery of claim 60, wherein the arithmetic mean Ra of the surface roughness of the positive electrode is 155 to 280 nm after the rechargeable lithium battery is charged and discharged.

62. The rechargeable lithium battery of claim 40, wherein the negative electrode has a density of 1.0 to 2.00 g/cc.

63. The rechargeable lithium battery of claim 40, wherein the negative active material is a carbonaceous material.

64. The rechargeable lithium battery of claim 63, wherein the carbonaceous material has a crystallinity size in a c axis of Lc of at least 20 nm and an exothermic peak of at least 700° C.

65. The rechargeable lithium battery of claim 63, wherein the carbonaceous material is a crystalline carbonaceous material prepared by carbonizing mesophase spherical particles and graphitizing, or a fibrous crystalline carbonaceous material prepared by carbonizing fibrous mesophase pitch and graphitizing.

66. A rechargeable lithium battery comprising:
a positive electrode comprising a nickel-based positive active material;
a negative electrode comprising a negative active material; and
an electrolyte comprising a non-aqueous solvent and a lithium salt,
wherein the arithmetic mean Ra of a surface roughness of the positive electrode is 155 to 356 nm; and the arithmetic mean Ra of a surface roughness of the negative electrode is 183 to 1159 nm, after the rechargeable lithium battery is charged and discharged.

67. The rechargeable lithium battery of claim 66, wherein the arithmetic mean Ra of the surface roughness of the positive electrode is 155 to 280 nm, and the arithmetic mean Ra of the surface roughness of the negative electrode is 183 to 1141 nm, after the rechargeable lithium battery is charged and discharged.

68. The rechargeable lithium battery of claim 66, wherein the root mean square Rq of the surface roughness of the positive electrode is 219 to 498 nm and the root mean square Rq of the surface roughness of the negative electrode is 255 to 1487 nm after the rechargeable lithium battery is charged and discharged.

69. The rechargeable lithium battery of claim 68, wherein the root mean square Rq of the surface roughness of the positive electrode is 219 to 350 nm and the root mean square Rq of the surface roughness of the negative electrode is 238 to 1000 nm after the rechargeable lithium battery is charged and discharged.

70. The rechargeable lithium battery of claim 66, wherein the arithmetic mean Ra of the surface roughness of the positive electrode is 150 to 312 nm and the arithmetic mean Ra of the surface roughness of the negative electrode is 165 to 965 nm before the rechargeable lithium battery is charged and discharged.

71. The rechargeable lithium battery of claim 70, wherein the arithmetic mean Ra of the surface roughness of the positive electrode is 150 to 225 nm and the arithmetic mean Ra of the surface roughness of the negative electrode is 180 to 500 nm before the rechargeable lithium battery is charged and discharged.

72. The rechargeable lithium battery of claim 71, wherein the root mean square Rq of the surface roughness of the positive electrode is 196 to 440 nm and the root mean square Rq of the surface roughness of the negative electrode is 211 to 1250 nm before the rechargeable lithium battery is charged and discharged.

73. The rechargeable lithium battery of claim 72, wherein the root mean square Rq of the surface roughness of the positive electrode is 196 to 330 nm and the root mean square Rq the surface roughness of the negative electrode is 240 to 700 nm before the rechargeable lithium battery is charged and discharged.

74. The rechargeable lithium battery of claim 66, wherein the charge and the discharge are performed at a charging rate between 0.1 and 2.0 C and a discharging rate between 0.1 and 2.0 C.

75. The rechargeable lithium battery of claim 74, wherein the charge and the discharge are performed at a charging rate between 0.2 and 1.5 C and a discharging rate between 0.2 and 1.5 C.

76. The rechargeable lithium battery of claim 66, wherein the charge and the discharge are performed at a charging current between 0.1 and 5.0 mA/cm$^2$ and a discharging current between 0.1 and 5.0 mA/cm$^2$.

77. The rechargeable lithium battery of claim 76, wherein the charge and the discharge are performed at a charging current between 0.2 and 4.0 mA/cm$^2$ and a discharging current between 0.2 and 4.0 mA/cm$^2$.

78. The rechargeable lithium battery of claim 66, wherein the rechargeable lithium battery is presented in a charged condition.

79. The rechargeable lithium battery of claim 66, wherein the rechargeable lithium battery is presented in a condition of being discharged.

80. The rechargeable lithium battery of claim 66, wherein the rechargeable lithium battery has an Open Circuit Voltage (OCV) of 1.0 to 5.5 V.

81. The rechargeable lithium battery of claim 80, wherein the rechargeable lithium battery has the OCV of 1.5 to 4.5 V.

82. The rechargeable lithium battery of claim 66, wherein the positive electrode has a density of 3.0 to 3.90 g/cc.

83. The rechargeable lithium battery of claim 66, wherein the nickel-based positive active material comprises at least one compound selected from the group consisting of compounds represented by formulas 1, 5-7, and 16:

$$LiNiO_2 \quad (1)$$

$$Li_aNi_bB_cM_dO_2 \quad (5)$$

(wherein $0.90 \leq a \leq 1.1$, $0 \leq b \leq 0.9$, $0 \leq c \leq 0.5$, $0.001 \leq d \leq 0.1$)

$$Li_aNi_bCo_cMn_dM_eO_2 \quad (6)$$

(wherein $0.90 \leq a \leq 1.1$, $0 \leq b \leq 0.9$, $0 \leq c \leq 0.5$, $0 \leq d \leq 0.5$, $0.001 \leq e \leq 0.1$)

$$Li_aNiM_bO_2 \quad (7)$$

($0.90 \leq a \leq 1.1$, $0.001 \leq b \leq 0.1$)

$$LiNiVO_4 \quad (16).$$

84. The rechargeable lithium battery of claim 83, wherein the positive active material comprises a nickel-based compound or a mixture of the nickel-based compound and another compound, wherein the nickel-based compound at least one compound selected from the group consisting of nickel-based compounds represented by formulas 1, 5-7, and 16, and the another compound is at least one compound selected from the group consisting of compounds represented by formulas 2-4, 8-15, and 17-18:

$$LiNiO_2 \quad (1)$$

$$LiCoO_2 \quad (2)$$

$$LiMnO_2 \quad (3)$$

$$LiMn_2O_4 \quad (4)$$

$$Li_aNi_bB_cM_dO_2 \quad (5)$$

(wherein $0.90 \leq a \leq 1.1$, $0 \leq b \leq 0.9$, $0 \leq c \leq 0.5$, $0.001 \leq d \leq 0.11$)

$$Li_aNi_bCo_cMn_dM_eO_2 \quad (6)$$

(wherein $0.90 \leq a \leq 1.1$, $0 \leq b \leq 0.9$, $0 \leq c \leq 0.5$, $0 \leq d \leq 0.5$, $0.001 \leq e \leq 0.1$)

$$Li_aNiM_bO_2 \quad (7)$$

($0.90 \leq a \leq 1.1$, $0.001 \leq b \leq 0.1$)

$$Li_aCoM_bO_2 \quad (8)$$

($0.90 \leq a \leq 1.1$, $0.001 \leq b \leq 0.1$)

$$Li_aMnM_bO_2 \quad (9)$$

($0.90 \leq a \leq 1.1$, $0.001 \leq b \leq 0.1$)

$$Li_aMn_2M_bO_4 \quad (10)$$

($0.90 \leq a \leq 1.1$, $0.001 \leq b \leq 0.1$)

$$DS_2 \quad (11)$$

$$LiDS_2 \quad (12)$$

$$V_2O_5 \quad (13)$$

$$LiV_2O_5 \quad (14)$$

$$LiEO_2 \quad (15)$$

$$LiNiVO_4 \quad (16)$$

$$Li_{(3-x)}F_2(PO_4)_3 (0 \leq x \leq 3) \quad (17)$$

$$Li_{(3-x)}Fe_2(PO_4)_3 (0 \leq x \leq 2) \quad (18)$$

(wherein B is Co or Mn;
D is Ti or Mo;
E is selected from the group consisting of Cr, V, Fe, Sc, and Y;
F is selected from the group consisting of V, Cr, Mn, Co, Ni, and Cu; and
M is at least one transition metal or lanthanide selected from the group consisting of Al, Cr, Mn, Fe, Mg, La, Ce, Sr, and V).

85. The rechargeable lithium battery of claim 66, wherein the negative electrode has a density of 1.0 to 2.00 g/cc.

86. The rechargeable lithium battery of claim 66, wherein the negative active material is a carbonaceous material.

87. The rechargeable lithium battery of claim 86, wherein the carbonaceous material has a crystallinity size in a c axis of Lc of at least 20 nm and an exothermic peak of at least 700° C.

88. The rechargeable lithium battery of claim 86, wherein the carbonaceous material is a crystalline carbonaceous material prepared by carbonizing mesophase spherical particles and graphitizing, or a fibrous crystalline carbonaceous material prepared by carbonizing fibrous mesophase pitch and graphitizing.

* * * * *